United States Patent
Itakura

(10) Patent No.: US 10,838,680 B2
(45) Date of Patent: Nov. 17, 2020

(54) DISPLAY SYSTEM AND COMPUTER-READABLE RECORDING MEDIUM

(71) Applicant: CASIO COMPUTER CO., LTD., Tokyo (JP)

(72) Inventor: Katsuyuki Itakura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/509,544

(22) Filed: Jul. 12, 2019

(65) Prior Publication Data

US 2020/0026480 A1    Jan. 23, 2020

(30) Foreign Application Priority Data

Jul. 17, 2018   (JP) ................................ 2018-134414

(51) Int. Cl.
*G06F 3/14* (2006.01)
*G06K 15/00* (2006.01)
*G07G 1/00* (2006.01)

(52) U.S. Cl.
CPC ......... *G06F 3/1423* (2013.01); *G06K 15/005* (2013.01); *G07G 1/0018* (2013.01)

(58) Field of Classification Search
None
See application file for complete search history.

(56) References Cited

U.S. PATENT DOCUMENTS

| 2005/0076302 | A1 | 4/2005 | Okamoto |
| 2006/0195495 | A1* | 8/2006 | Asano .................. H04L 67/125 708/111 |
| 2014/0036304 | A1* | 2/2014 | Takasu ................. G06F 3/1288 358/1.15 |
| 2015/0032557 | A1 | 1/2015 | Suzuki |
| 2016/0063563 | A1* | 3/2016 | Abad Fernandez ........................ G06Q 30/0268 705/14.65 |

(Continued)

FOREIGN PATENT DOCUMENTS

| JP | 2002183834 A | 6/2002 |
| JP | 2015026169 A | 2/2015 |

(Continued)

OTHER PUBLICATIONS

Extended European Search Report (EESR) dated Dec. 18, 2019 issued in European Application No. 19186474.3.

*Primary Examiner* — Frantz Bataille
(74) *Attorney, Agent, or Firm* — Holtz, Holtz & Volek PC

(57) ABSTRACT

A display system includes an electronic apparatus, a display and a processor. The electronic apparatus is configured to display a first display screen on a first display. The display is configured to receive a touch input and is configured to display an operation panel as a second display screen. The processor is configured to execute a processing including a display control processing. The display control processing controls the second display screen on the display so that the first display screen is displayed on the operation panel, during a predetermined conduct including a control on the first display screen in accordance with user operation via a first operation unit, when the display is connected to the electronic apparatus as a second operation unit.

9 Claims, 14 Drawing Sheets

(56) References Cited

U.S. PATENT DOCUMENTS

| | | | |
|---|---|---|---|
| 2016/0358149 A1 | 12/2016 | Suzuki | |
| 2017/0169647 A1* | 6/2017 | Ono | ................. G07F 19/202 |
| 2017/0185363 A1 | 6/2017 | Ting et al. | |
| 2017/0364887 A1 | 12/2017 | Dullings et al. | |
| 2018/0341940 A1 | 11/2018 | Suzuki | |

FOREIGN PATENT DOCUMENTS

| | | |
|---|---|---|
| JP | 2015035153 A | 2/2015 |
| JP | 2016095587 A | 5/2016 |

\* cited by examiner

CHECKOUT CLERK: SATO ICHIRO　　SALES REGISTRATION　　2018/03/02 14:39

| TOTAL | ¥0 (TAX ¥0) | | CUSTOMER | | CUSTOMER GROUP | « | » |

241 —

242 —

| DESCRIPTION | QUANTITY | AMOUNT |
| --- | --- | --- |

MENU2

| OOLONG TEA ¥270 | GREEN TEA ¥270 | |
| COFFEE ¥400 | BLACK TEA ¥500 | |
| COCKTAIL ¥1,200 | GLASS WINE ¥800 | CRAFT BEER ¥980 |

X 0

243 —

| 7 | 8 | 9 | WORD |
| 4 | 5 | 6 | NUMBER |
| 1 | 2 | 3 | RETURN |
| 0 | 00 | C | CE |

« | MENU1 | MENU2 | MENU3 | MENU4 | »
　 | MENU5 | MENU6 | MENU7 | MENU8 |

| PAUSE | COMMODITY | TRANSACTION | FUNCTION | RECEIPT | SUBTOTAL | TEMPORARY TOTAL | PAYMENT |

FIG. 9

| CHECKOUT CLERK: SATO ICHIRO | SALES REGISTRATION | | | 2018/03/02 14:39 |
|---|---|---|---|---|
| TOTAL ¥0 (TAX ¥0) | | | CUSTOMER | CUSTOMER GROUP |
| DESCRIPTION | | QUANTITY | AMOUNT | « » |
| | | | MENU2 | |
| | | | OOLONG TEA ¥270 | GREEN TEA ¥270 |
| | BOX LUNCH ¥1,300 | | BLACK TEA 500 | |
| | CURRY AND RICE ¥900 | | GLASS WINE 800 | CRAFT BEER ¥980 |
| | BLACK TEA ¥500 | | | |
| × | SUBTOTAL ¥2,700 | | | |
| WORD | | | « MENU1 | MENU2 MENU3 MENU4 |
| NUMBER | 7 | 8 | 9 | MENU5 MENU6 MENU7 MENU8 |
| RETURN | 4 | 5 | 6 | |
| CE | 1 | 2 | 3 | |
| | 0 | 00 | C | |
| PAUSE | COMMODITY | TRANSACTION | FUNCTION | RECEIPT SUBTOTAL TEMPORARY TOTAL PAYMENT |

FIG. 10

| CHECKOUT CLERK: SATO ICHIRO | | SALES REGISTRATION | | 2018/03/02 14:39 |
|---|---|---|---|---|
| TOTAL ¥500 (TAX ¥37) | | CUSTOMER | | CUSTOMER GROUP ≪ ≫ |
| DESCRIPTION | QUANTITY | AMOUNT | MENU2 | |
| BLACK TEA | 1 | 500 | OOLONG TEA ¥270 | GREEN TEA ¥270 |
| | | | COFFEE ¥400 | BLACK TEA ¥500 |
| | | | COCKTAIL ¥1,200 | GLASS WINE ¥800 |
| | | | | CRAFT BEER ¥980 |
| × | | 0 | ≪ | ≫ |
| WORD | 7 | 8 | 9 | MENU1 | MENU2 | MENU3 | MENU4 |
| NUMBER | 4 | 5 | 6 | MENU5 | MENU6 | MENU7 | MENU8 |
| RETURN | 1 | 2 | 3 | RECEIPT | SUBTOTAL | TEMPORARY TOTAL | PAYMENT |
| CE | 0 | 00 | C | | | | |
| PAUSE | COMMODITY | TRANSACTION | FUNCTION | | | | |

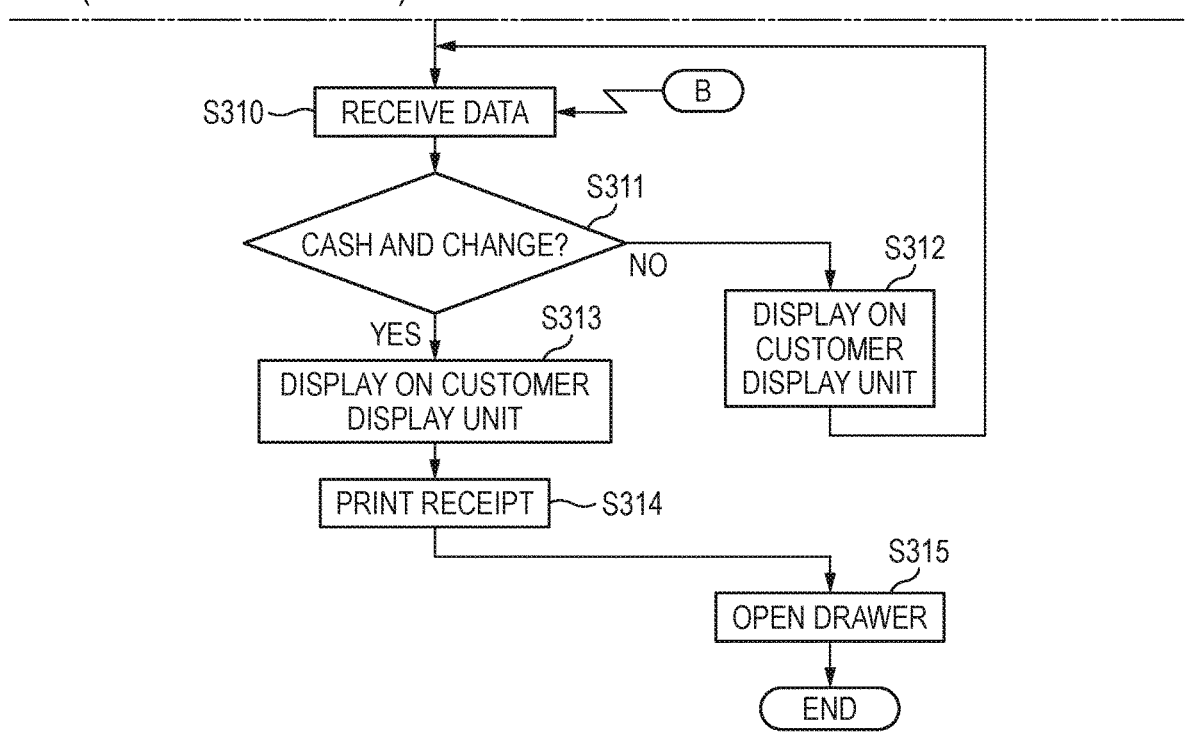

FIG. 18

DISPLAY SYSTEM AND COMPUTER-READABLE RECORDING MEDIUM

CROSS-REFERENCE TO RELATED APPLICATIONS

This application is based upon and claims the benefit of priority from prior Japanese patent application No. 2018-134414, filed on Jul. 17, 2018, the entire contents of which are incorporated herein by reference.

TECHNICAL FIELD

The present invention relates to a display system and a computer-readable recording medium which enable cooperation between electronic apparatuses.

BACKGROUND ART

Tablet terminals have been popular in recent years for use in electronic cash register applications (tablet electronic cash registers) since they can be operated anywhere in a store while being held by hand and introduction cost is low. Tablet electronic cash registers are easy for sales registration corresponding to payment by a credit card or electronic money. It is difficult, however, to print a receipt or handle cash with a tablet electronic cash register alone.

As one of solutions to such a problem, for example, JP-A-2016-95587 discloses a technique for displaying data to be displayed on a customer display during sales registration processing on a customer portable terminal as well as a technique for creating an electronic receipt at the customer portable terminal. However, there is no description of a technique for enabling cooperation between a tablet electronic cash register and an electronic cash register in the related art that includes a printer for printing a receipt and a drawer for storing money.

When the tablet electronic cash register and the electronic cash register in the related art are to cooperate, it is necessary to switch or interlock devices of the two electronic cash registers.

The present invention is made in view of such a background and an object of the present invention is to provide a display system and a recording medium which enable flexible cooperation between electronic apparatuses.

SUMMARY OF INVENTION

According to one aspect of the disclosure, a display system includes an electronic apparatus, a display and a processor. The electronic apparatus is configured to display a first display screen on a first display. The display is configured to receive a touch input and is configured to display an operation panel as a second display screen. The processor is configured to execute a processing including a display control processing. The display control processing controls the second display screen on the display so that the first display screen is displayed on the operation panel, during a predetermined conduct including a control on the first display screen in accordance with user operation via a first operation unit, when the display is connected to the electronic apparatus as a second operation unit.

According to another aspect of the disclosure, a non-transitory computer-readable recording medium stores a program on a computer provided in a display system. The display system includes an electronic apparatus, a display. The electronic apparatus is configured to display a first display screen on a first display. The display is configured to receive a touch input and is configured to display an operation panel as a second display screen. The program executes a proceeding including a display control processing. The display control processing controls the second display screen on the display so that the first display screen is displayed on the operation panel, during a predetermined conduct including a control on the first display screen in accordance with user operation via a first operation unit, when the display is connected to the electronic apparatus as a second operation unit.

BRIEF DESCRIPTION OF DRAWINGS

FIG. 6 shows configurations of a sales registration screen displayed on the tablet according to the present embodiment.

FIG. 9 shows a display screen of the tablet during sales registration processing at the electronic cash register after the electronic cash register and the tablet are connected according to the present embodiment.

FIG. 10 shows a sales registration screen during cooperation processing according to the present embodiment.

FIG. 18 shows a display screen of the tablet during the sales registration processing at the electronic cash register after the electronic cash register and the tablet are connected according to the modification of the present embodiment.

DESCRIPTION OF EMBODIMENTS

Overall Configuration of Electronic Cash Register System

Figure 1:
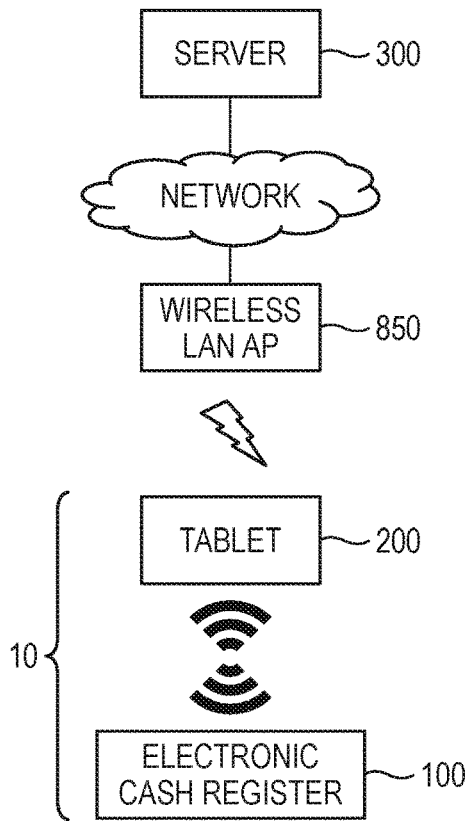
FIG. 1 shows an overall configuration of an electronic cash register system according to an embodiment.

An electronic cash register system according to an embodiment of the present invention is described below. FIG. 1 shows an overall configuration of an electronic cash register system 10 according to the present embodiment. The electronic cash register system 10 includes an electronic cash register 100 including a drawer and a printer, and a tablet 200. The electronic cash register 100 and the tablet 200 can communicate with each other via wireless communication such as Bluetooth (registered trademark). The tablet 200 can access a server 300 via a wireless Local Area Network (LAN) access point ("wireless LAN AP" in FIG. 1) 850. The tablet 200 functions as an electronic cash register that enables payment using a credit card or electronic money.

Configurations of Electronic Cash Register

Figure 2:
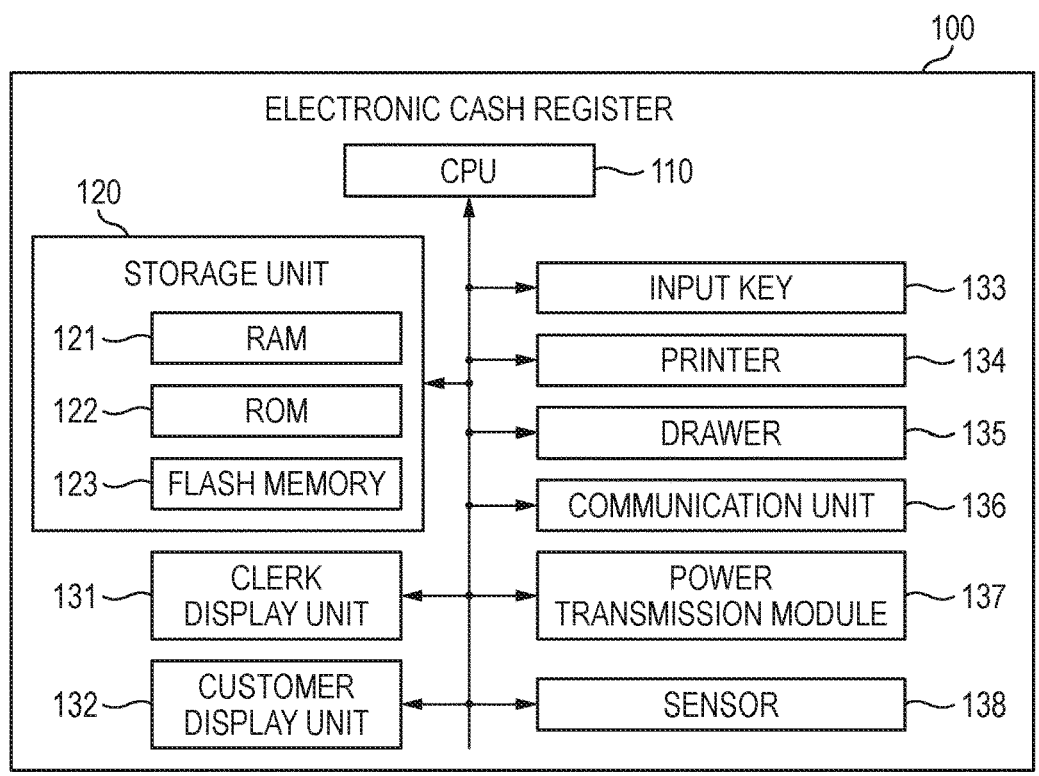
FIG. 2 is a block diagram showing functional configurations of an electronic cash register according to the present embodiment.
Figures 3, 4:
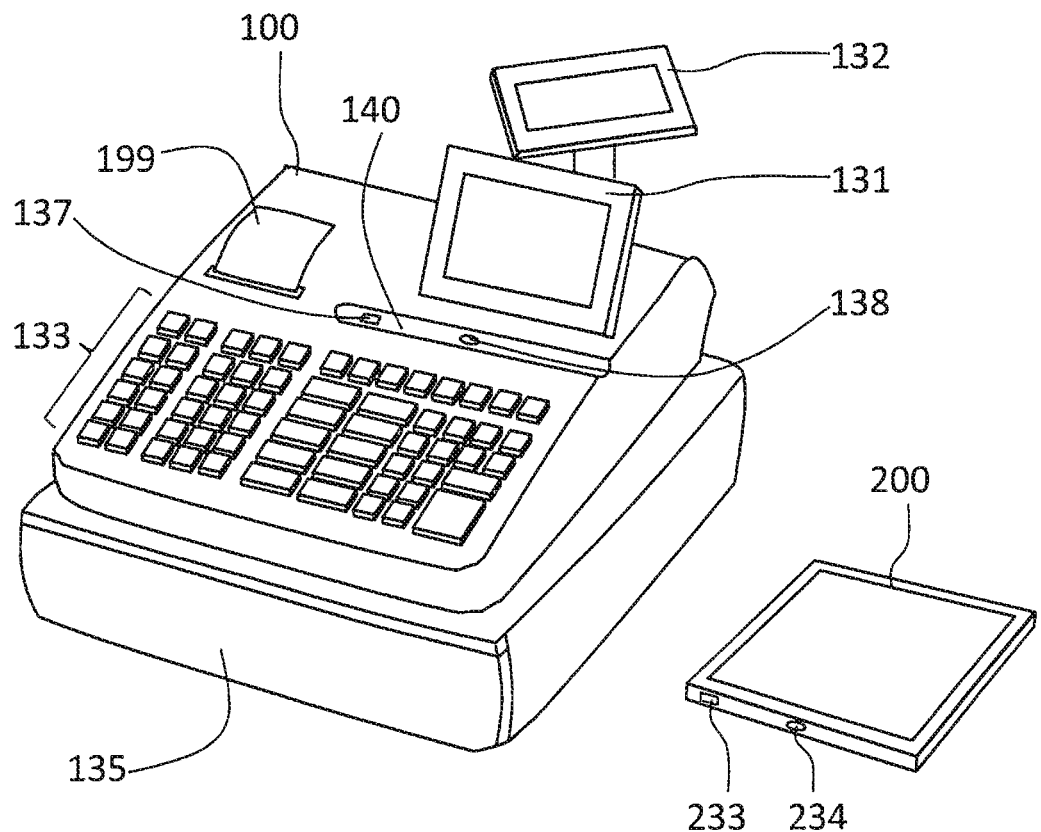
FIG. 3 shows appearances of the electronic cash register and a tablet according to the present embodiment.
FIG. 4 shows a sales registration screen displayed on a clerk display unit according to the present embodiment.

FIG. 2 is a block diagram showing functional configurations of the electronic cash register 100 according to the present embodiment. FIG. 3 shows appearances of the electronic cash register 100 and the tablet 200 according to the present embodiment. The configurations of the electronic cash register 100 are described with reference to FIGS. 2 and 3.

The electronic cash register 100 includes a Central Processing Unit (CPU) 110, a storage unit 120, a clerk display unit 131, a customer display unit 132, an input key 133, a printer 134, a drawer 135, a communication unit 136, a power transmission module 137, and a sensor 138.

The CPU 110 causes the electronic cash register 100 to function by executing a program (not shown) stored in the storage unit 120. The storage unit 120 includes a random access memory (RAM) 121, a read only memory (ROM) 122, and a flash memory 123. The storage unit 120 stores the program that causes the electronic cash register 100 to function as well as data during processing.

The clerk display unit 131, which is a display for a clerk who operates the electronic cash register 100, displays a sales registration screen (see FIG. 4 described below) and the like. FIG. 4 shows a sales registration screen 151 displayed on the clerk display unit 131 according to the present embodiment. The sales registration screen 151 is a screen displayed on the clerk display unit 131 during the sales registration processing at the electronic cash register 100, on which names and amounts of sold and registered commodities, as well as a subtotal and the like, are displayed. In addition to the sales registration screen 151, a check screen, a calculator screen, and the like (not shown) are displayed according to operation modes of the electronic cash register.

Referring back to FIG. 2, the customer display unit 132 is a display for a customer. The input key 133 is a key operated by a clerk. The printer 134, which is a printer that prints a receipt 199, is disposed inside a housing of the electronic cash register 100 at a position below the receipt 199. The drawer 135 is a cash storage. The communication unit 136 is a communication device that transmits and receives data, which can communicate with the tablet 200.

Figure 8:
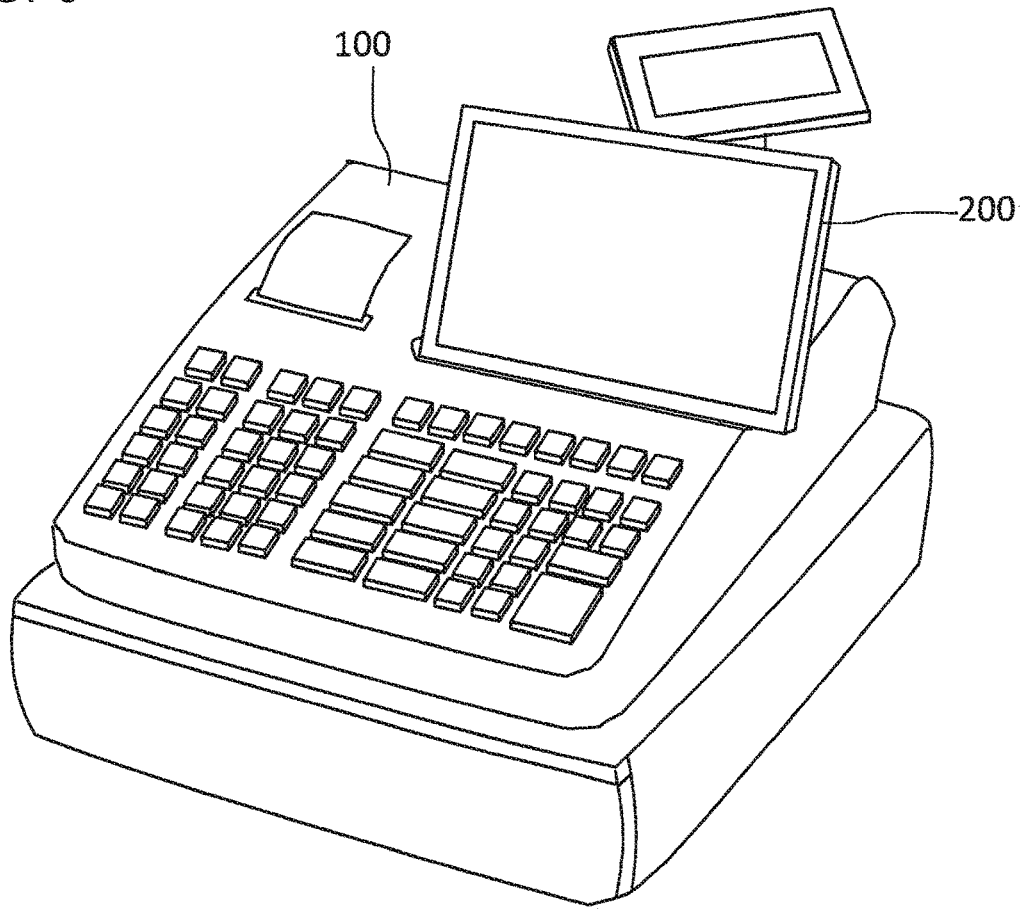
FIG. 8 shows the appearance when the tablet is arranged on the electronic cash register according to the present embodiment.

The power transmission module 137 charges the tablet 200 when the tablet 200 is arranged on the electronic cash register 100 (see FIG. 8 described below) in such a manner that a lower side of the tablet 200 fits into a groove 140 and the tablet 200 stands on the clerk display unit 131 (see FIG. 8 described below). The charging may be wireless charging using electromagnetic induction, or charging by connecting a contact point.

The sensor 138 detects that the tablet 200 is arranged on the electronic cash register 100 and notifies the CPU 110 of this fact. The fact that the tablet 200 is arranged on the electronic cash register 100 may be detected by, instead of the sensor 138, detecting that the power transmission module 137 is in a chargeable state. Alternatively, the communication unit 136 may detect that the tablet 200 is arranged on the electronic cash register 100 based on intensity of communication radio waves of the tablet 200.

Configurations of Tablet

Figure 5:
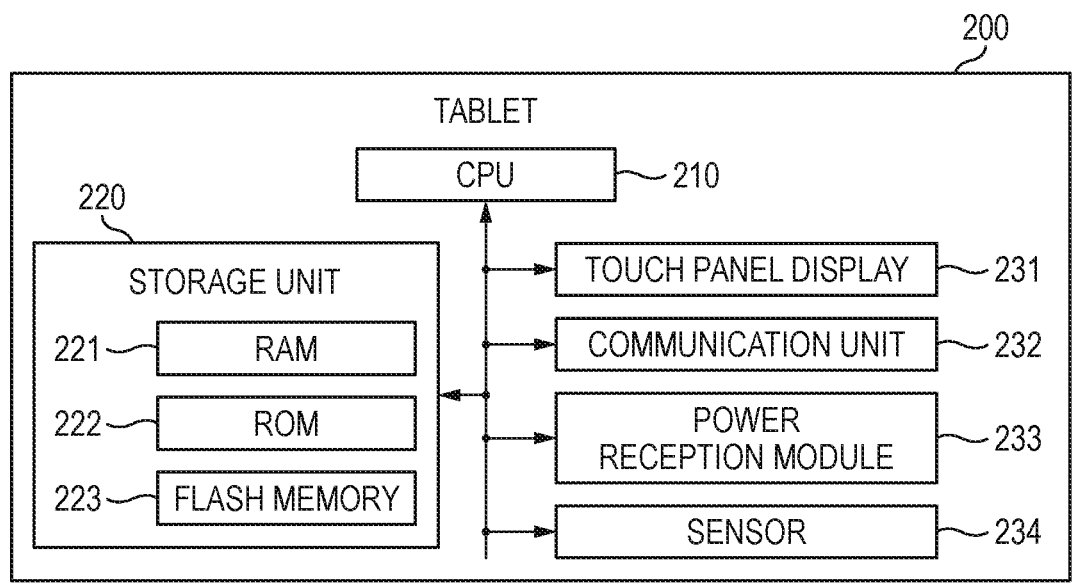
FIG. 5 shows functional configurations of the tablet according to the present embodiment.

FIG. 5 shows functional configurations of the tablet 200 according to the present embodiment. The tablet 200 includes a CPU 210, a storage unit 220, a touch panel display 231, a communication unit 232, a power reception module 233, and a sensor 234.

The CPU 210 causes the tablet 200 to function as an electronic cash register by executing a program (not shown) stored in the storage unit 220. The storage unit 220 includes a RAM 221, a ROM 222, and a flash memory 223. The storage unit 220 stores the program that causes the tablet 200 to function as an electronic cash register as well as data during processing.

The touch panel display 231 also serves as an input unit. The communication unit 232 is a communication device that transmits and receives data, which can communicate with the electronic cash register 100 and the server 300 (see FIG. 1). The power reception module 233 receives power transmission from the power transmission module 137 and charges the tablet 200 when the tablet 200 is arranged on the electronic cash register 100.

The sensor 234 detects that the tablet 200 is arranged on the electronic cash register 100 and notifies the CPU 210 of this fact. The fact that the tablet 200 is arranged on the electronic cash register 100 may be detected by, instead of the sensor 234, detecting that the power reception module 233 is in a chargeable state. Alternatively, the communication unit 232 may detect that the tablet 200 is arranged on the electronic cash register 100 based on intensity of communication radio waves of the electronic cash register 100.

FIG. 6 shows configurations of a sales registration screen 240 displayed on the tablet 200 according to the present embodiment. The sales registration screen 240 includes a region 241 which displays a total amount of registered commodities, a region 242 which displays names, quantities, and amounts of registered commodities, a numeric keypad 243 which inputs numerical values such as quantities of commodities and the number of customers, and a menu area 244 in which buttons are arranged to select commodities.

Usage Procedure of Electronic Cash Register and Tablet

Figure 7:
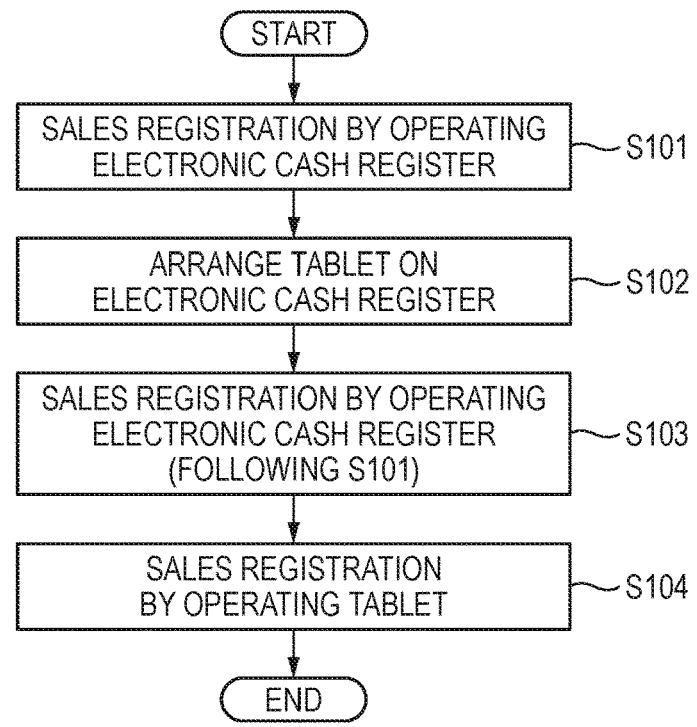
FIG. 7 is a flowchart showing a usage procedure when the tablet is arranged on the electronic cash register during sales registration at the electronic cash register according to the present embodiment.

Procedures of using the electronic cash register and the tablet by a clerk are described before describing connection processing and cooperation processing between the electronic cash register and the tablet. FIG. 7 is a flowchart showing a usage procedure when the tablet is arranged on the electronic cash register during the sales registration at the electronic cash register according to the present embodiment.

In step S101, the clerk operates the input key 133 of the electronic cash register 100 to perform sales registration. Registration contents are displayed on the clerk display unit 131 (see FIG. 4).

In step S102, the clerk arranges the tablet 200 on the electronic cash register 100. FIG. 8 shows the appearance when the tablet 200 is arranged on the electronic cash register 100 according to the present embodiment. As shown in FIG. 8, the clerk arranges the tablet 200 in such a manner that the lower side of the tablet 200 fits into the groove 140 (see FIG. 3) of the electronic cash register 100 and the tablet 200 stands on the clerk display unit 131. At this time, the connection processing described below is carried out by the electronic cash register 100 and the tablet 200.

In step S103, the clerk operates the electronic cash register 100 to continue the sales registration in step S101. The clerk operates the input key 133 to perform the sales registration. Registration contents are displayed on the tablet 200. FIG. 9 shows a display screen of the tablet 200 during the sales registration processing at the electronic cash register 100 after the electronic cash register 100 and the tablet 200 are connected according to the present embodiment. At the center of the touch panel display 231, a clerk display unit alternate screen 250, on which names and amounts of commodities registered in the electronic cash register 100 as well as a subtotal are displayed, is displayed above the sales registration screen 240. The clerk display unit alternate screen 250 is an alternative to the sales registration screen 151 (see FIG. 4) displayed on the clerk display unit 131 of the electronic cash register 100.

Referring back to FIG. 7, when the sales registration processing in step S103 is completed (commodities are selected to be paid), the clerk operates the tablet 200 to perform sales registration in step S104. At this time, the cooperation processing described below is carried out by the electronic cash register 100 and the tablet 200. During the cooperation processing, the clerk operates the touch panel display 231 of the tablet 200 instead of the input key 133 of the electronic cash register 100 to perform sales registration. FIG. 10 shows a sales registration screen 240A during the cooperation processing according to the present embodiment. The clerk can select a commodity by tapping a button in the menu area 244, as in the case of using the tablet 200 alone. On the sales registration screen 240A, black tea is selected and the total amount is displayed (see regions 241A and 242A).

Figure 11:
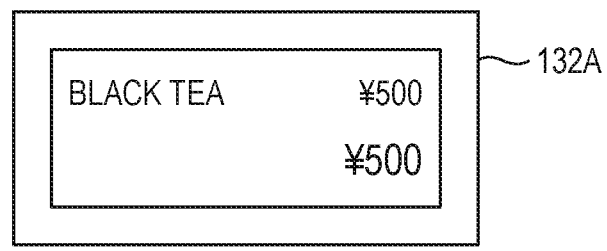
FIG. 11 shows a customer display unit that displays information on a commodity that is sold and registered during the cooperation processing according to the present embodiment.
Figure 12:
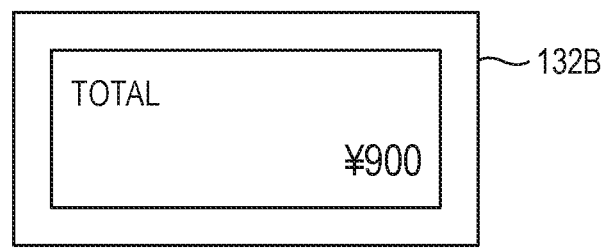
FIG. 12 shows the customer display unit that displays a total amount during the cooperation processing according to the present embodiment.

Contents of commodity selection are displayed both on the touch panel display 231 and on the customer display unit 132 (see FIG. 3) of the electronic cash register 100. FIG. 11 shows a customer display unit 132A that displays information on a commodity that is sold and registered during the cooperation processing according to the present embodiment. FIG. 12 shows a customer display unit 132B that displays a total amount during the cooperation processing according to the present embodiment. As shown in FIGS. 11 and 12, while the tablet 200 is operated, the customer display unit provided in the electronic cash register 100 displays sales registration contents as in the customer display unit provided in the tablet 200. Further, it is possible to print a receipt from the printer 134 of the electronic cash register 100 or use the drawer 135 during cash payment.

Figure 13:
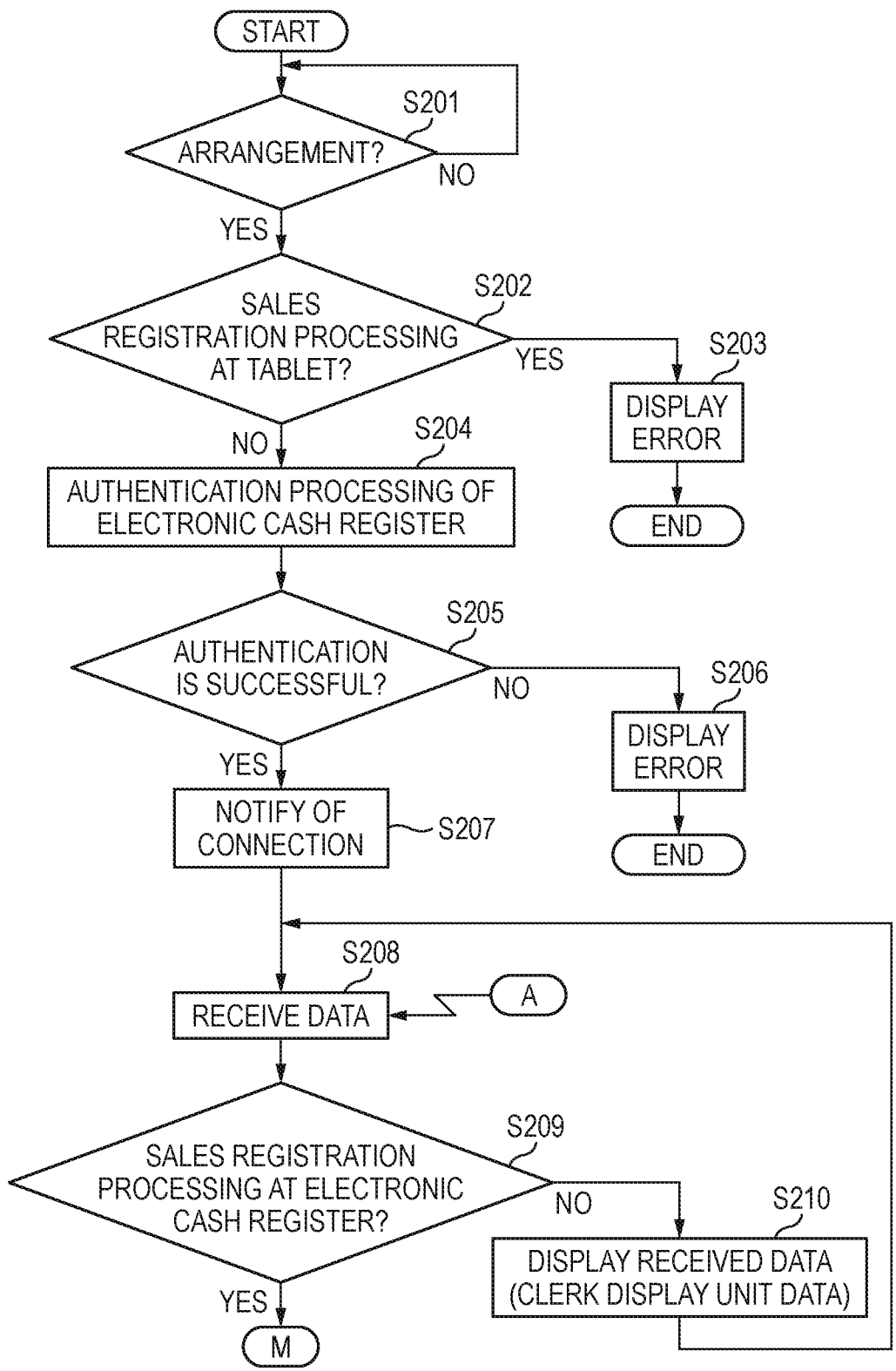
FIG. 13 is a flowchart (1) showing processing of the tablet in connection processing and the cooperation processing between the electronic cash register and the tablet according to the present embodiment.
Figure 14:
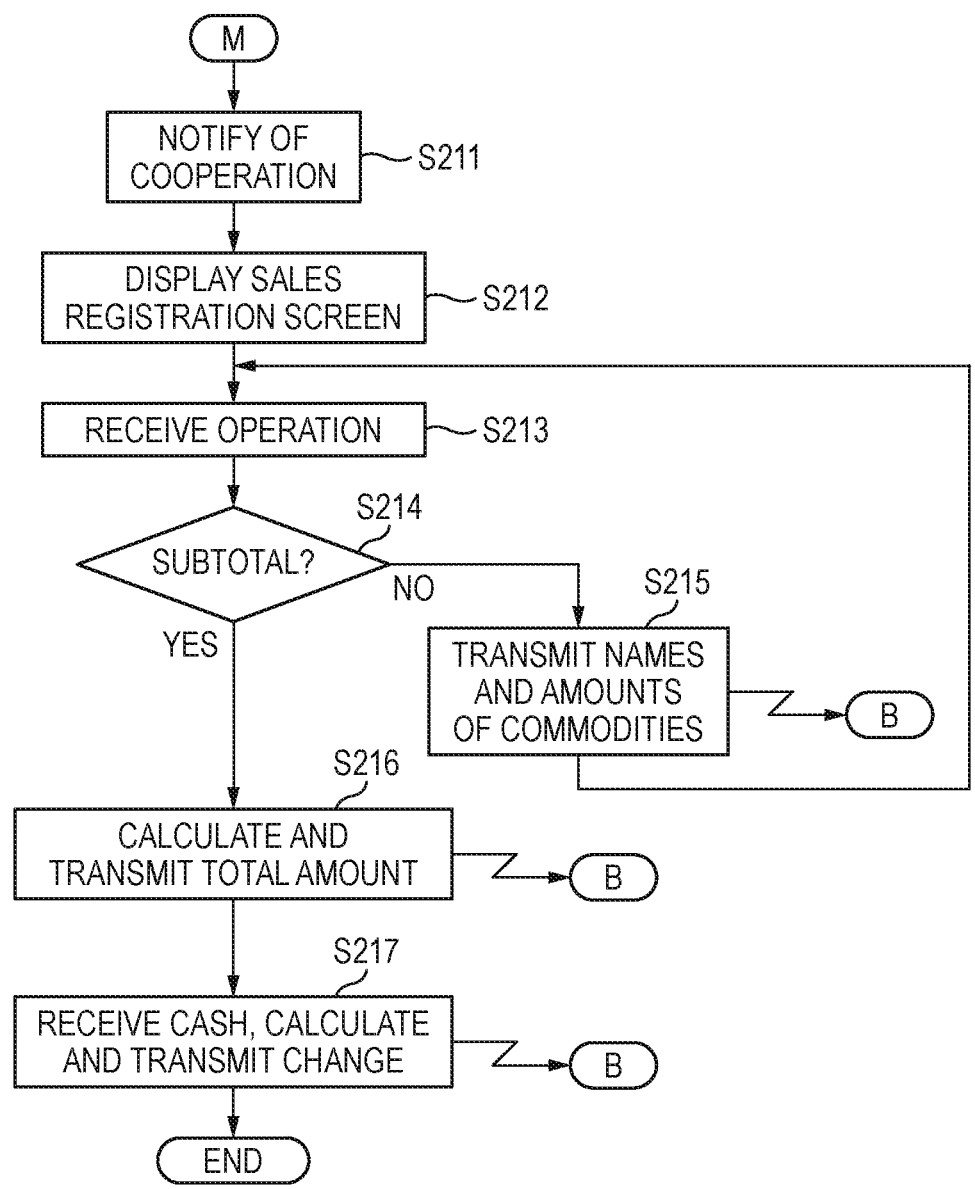
FIG. 14 is a flowchart (2) showing processing of the tablet in the connection processing and the cooperation processing between the electronic cash register and the tablet according to the present embodiment.

Connection Processing and Cooperation Processing Between Electronic Cash Register and Tablet Processing of the electronic cash register 100 and the tablet 200 corresponding to operation of the clerk shown in steps S102 to S104 in FIG. 7 is described below. FIG. 13 is a flowchart (1) showing processing of the tablet 200 in the connection processing and the cooperation processing between the electronic cash register 100 and the tablet 200 according to the present embodiment. FIG. 14 is a flowchart (2) showing processing of the tablet 200 in the connection processing and the cooperation processing between the electronic cash register 100 and the tablet 200 according to the present embodiment. With reference to FIGS. 13 and 14, processing of the tablet 200 in the connection processing carried out by arranging the tablet 200 on the electronic cash register 100, as well as in the cooperation processing between the electronic cash register 100 and the tablet 200 after the connection processing, is described.

Identification authentication information of the electronic cash register 100 that can cooperate by connection is registered in the storage unit 220 of the tablet 200 in advance. On the other hand, identification authentication information of the tablet 200 that can cooperate by connection is registered in the storage unit 120 of the electronic cash register 100 in advance. The identification authentication information includes addresses of communication devices provided in the communication units 136 and 232 and key information of encryption processing, which are stored in the storage units 120, 220.

In step S201, the CPU 210 of the tablet 200 determines using the sensor 234 whether the tablet 200 is arranged on the electronic cash register 100. As shown in FIG. 8, the sensor 234 detects such an arrangement when the tablet 200 is arranged (see step S102 in FIG. 7) in such a manner that the lower side of the tablet 200 fits into the groove 140 (see FIG. 3) of the electronic cash register 100 and the tablet 200 stands on the clerk display unit 131.

Referring back to FIG. 13, the CPU 210 proceeds to step S202 when detecting such the arrangement (step S201→Y), and returns to step S201 when such the arrangement is not detected (step S201→N). Steps S202 to S207 described below are the connection processing at the tablet 200.

In step S202, the CPU 210 proceeds to step S203 if the tablet 200 is in the sales registration processing (step S202→Y), and proceeds to step S204 if the tablet 200 is not in the sales registration processing (step S202→N).

In step S203, the CPU 210 displays, on the touch panel display 231, that the tablet 200 is in the sales registration processing and that the connection processing with the electronic cash register 100 is not allowed, and ends the connection processing.

In step S204, the CPU 210 executes authentication processing of the electronic cash register 100. The identification authentication information is used in the authentication processing.

In step S205, the CPU 210 proceeds to step S207 if the authentication processing in step S204 is successful (step S205→Y), and proceeds to step S206 if the authentication processing fails (step S205→N).

In step S206, the CPU 210 displays, on the touch panel display 231, that the connection processing is not allowed since the electronic cash register 100 is not registered as a cooperation partner, and ends the connection processing.

In step S207, the CPU 210 displays, on the touch panel display 231, that the tablet 200 is connected to the electronic cash register 100. The connection processing ends here.

In step S208, the CPU 210 receives data from the electronic cash register 100. The received data is data displayed on the clerk display unit 131 by the electronic cash register 100 (see step S307 in FIG. 15 described below) before connection, or a notification of end of the sales registration processing at the electronic cash register 100 (see step S309 in FIG. 15 described below).

In step S209, the CPU 210 proceeds to step S211 if the data received in step S208 is the notification of end of the sales registration processing at the electronic cash register 100 (step S209→Y), and proceeds to step S210 if the data is data displayed on the clerk display unit instead of the notification of end of the sales registration processing (step S209→N).

In step S210, the CPU 210 displays, on the touch panel display 231, the data displayed on the clerk display unit such as names and amounts of commodities received in step S208 (see clerk display unit alternate screen 250 in FIG. 9). Steps S208 to S210 are processing of the tablet 200 corresponding to step S103 in FIG. 7.

Although a part of the sales registration screen 240 is also displayed on the touch panel display 231 on which the clerk display unit alternate screen 250 is displayed (see FIG. 9), the CPU 210 does not accept operation even when the part of the sales registration screen 240 is operated. Operation to the tablet 200 is restricted while the display unit alternate screen 250 is displayed.

Referring to FIG. 14, in step S211, the CPU 210 displays, on the touch panel display 231, that cooperation with the electronic cash register 100 is started. The following steps S212 to S217 are the cooperation processing at the tablet 200.

In step S212, the CPU 210 displays the sales registration screen 240A (see FIG. 10) on the touch panel display 231. Thereafter, the clerk operates the sales registration screen 240A to perform the sales registration processing. The sales registration processing corresponds to step S104 in FIG. 7.

In step S213, the CPU 210 receives a conduct of the sales registration processing that is input on the sales registration screen 240A by the clerk.

In step S214, the CPU 210 proceeds to step S216 if the conduct received in step S213 is to tap a subtotal button 245 (see FIG. 10) (step S214→Y), and proceeds to step S215 if the operation is not to tap the subtotal button 245 (step S214→N).

In step S215, the CPU 210 transmits names and amounts of commodities selected in the proceeds received in step S213 to the electronic cash register 100, and returns to step S213.

In step S216, the CPU 210 calculates a total amount of the selected commodities and transmits the total amount to the electronic cash register 100. The description is continued hereinafter assuming that the customer pays in cash.

In step S217, the CPU 210 receives the cash, calculates the change, and transmits the calculated amount to the electronic cash register 100.

Figure 15:
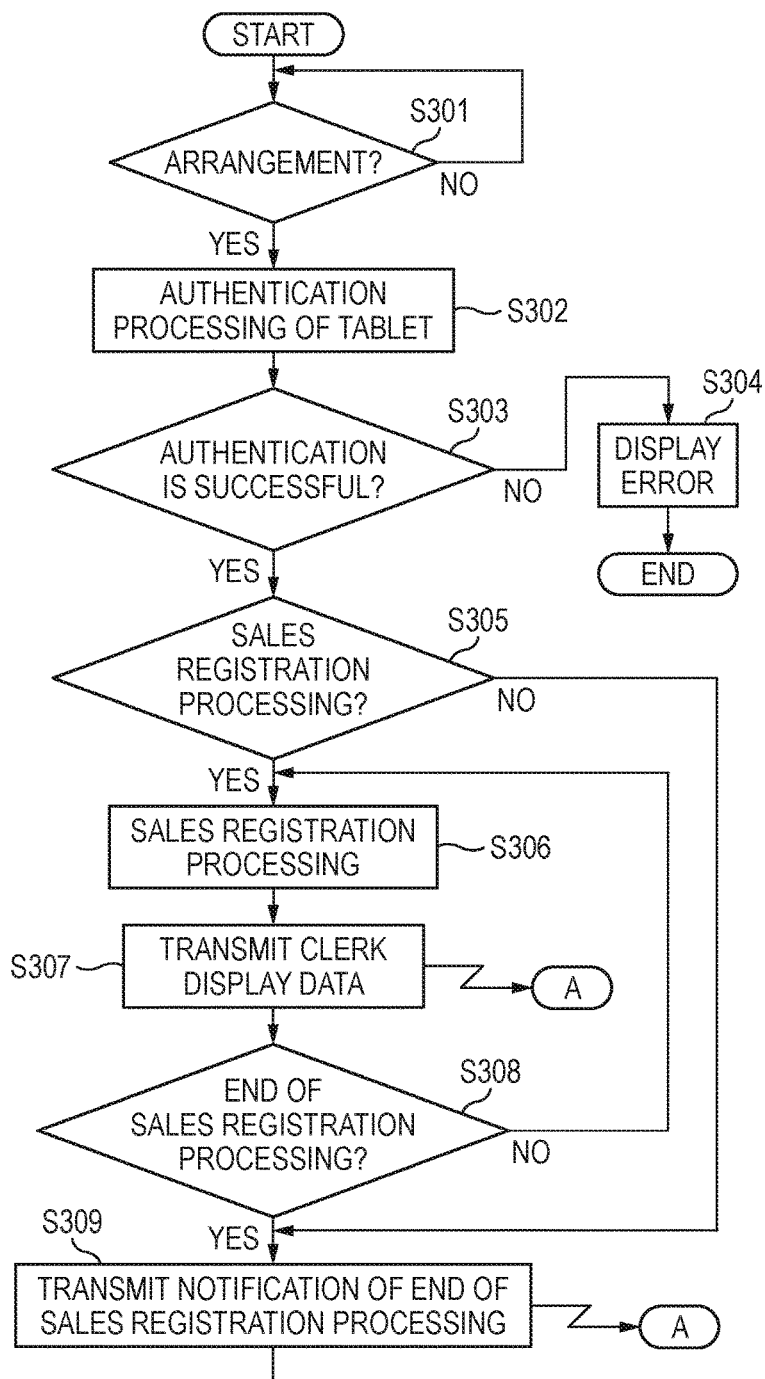
FIG. 15 is a flowchart showing processing of the electronic cash register in the connection processing and the cooperation processing between the electronic cash register and the tablet according to the present embodiment.

FIG. 15 is a flowchart showing processing of the electronic cash register 100 in the connection processing and the cooperation processing between the electronic cash register 100 and the tablet 200 according to the present embodiment. With reference to FIG. 15, processing of the electronic cash register 100 in the connection processing carried out by arranging the tablet 200 on the electronic cash register 100, as well as in the cooperation processing between the electronic cash register 100 and the tablet 200 after the connection processing, is described.

In step S301, the CPU 110 of the electronic cash register 100 determines using the sensor 138 whether the tablet 200 is arranged on the electronic cash register 100. The CPU 110 proceeds to step S302 when detecting the arrangement (step S301→Y), and returns to step S301 when the arrangement is not detected (step S301→N). Processing of detecting the arrangement corresponds to step S102 in FIG. 7. Steps S302 to S304 described below are the connection processing at the electronic cash register 100.

In step S302, the CPU 110 executes authentication processing of the tablet 200. The identification authentication information is used in the authentication processing.

In step S303, the CPU 110 proceeds to step S305 if the authentication processing in step S302 is successful (step S303→Y), and proceeds to step S304 if the authentication processing fails (step S303→N).

In step S304, the CPU 110 displays, on the clerk display unit 131 and the customer display unit 132 (a third display), that the connection processing is not allowed since the tablet 200 is not registered as a cooperation partner, and ends the connection processing. The CPU 110 may output a warning sound from a speaker (not shown) in addition to the display.

In step S305, the CPU 110 proceeds to step S306 if the electronic cash register 100 is in the sales registration processing (step S305→Y), and proceeds to step S309 if the electronic cash register 100 is not in the sales registration processing (step S305→N).

In step S306, the CPU 110 executes the sales registration processing. The sales registration processing, which is started before the tablet 200 is arranged on the electronic cash register 100, corresponds to step S103 in FIG. 7 in which the clerk selects commodities or performs payment processing using the input key 133.

In step S307, the CPU 110 transmits, to the tablet 200, the clerk display data such as names and amounts of commodities as well as a subtotal that are subjected to the sales registration processing in step S306. The transmitted clerk display data is received in step S208 of FIG. 13.

In step S308, the CPU 110 proceeds to step S309 if the sales registration processing is completed (step S308→Y), and returns to step S306 if the sales registration processing is not completed (step S308→N).

In step S309, the CPU 110 transmits the notification of end of the sales registration processing to the tablet 200. The transmitted notification of end of the sales registration processing is received in step S208 of FIG. 13. The following steps S310 to S315 are the cooperation processing at the electronic cash register 100.

In step S310, the CPU 110 receives data. The received data is transmitted by the tablet 200 in steps S215 to S217 in FIG. 14, including: (1) names and amounts of commodities; (2) the total amount; and (3) the cash amount and the change amount.

In step S311, the CPU 110 proceeds to step S313 if the data received in step S310 is the cash amount and the change amount (step S311→Y), and proceeds to step S312 if the data is not the cash amount or the change amount (step S311→N).

In step S312, the CPU 110 displays the received names and amounts of commodities or subtotal on the customer display unit 132 (see the customer display unit 132A in FIG. 11 and the customer display unit 132B in FIG. 12), and returns to step S310.

In step S313, the CPU 110 displays the received cash amount and change amount on the customer display unit 132.

In step S314, the CPU 110 instructs the printer 134 to print a receipt. Contents to be printed include: (1) names and amounts of commodities; (2) the total amount; and (3) the cash amount and change amount received in step S310.

In step S315, the CPU 110 opens the drawer 135. Steps S310 to S315 are processing of the electronic cash register 100 corresponding to step S104 in FIG. 7.

Features of Connection Processing and Cooperation Processing

When the tablet 200 is arranged on the electronic cash register 100, the electronic cash register 100 and the tablet 200 detect this arrangement, perform authentication, and are connected (steps S201 to S207 in FIG. 13 and steps S301 to S304 in FIG. 15). The connection fails if the tablet 200 is in the sales registration processing (see step S202→Y, step S203).

On the other hand, the connection with the tablet 200 is allowed even when the electronic cash register 100 is in the sales registration processing (step S305→Y), and the sales registration processing can be continued (step S306). Therefore, the clerk can arrange the tablet 200 on the electronic cash register 100 without worrying about whether the electronic cash register 100 is in use or not.

After the connection, commodity names and amounts are displayed on the clerk display unit alternate screen 250 (see FIG. 9) different from the normal sales registration screen 240 (see FIG. 6) of the tablet 200. Therefore, the clerk can easily recognize that the displayed commodities are registered by the electronic cash register 100 instead of the tablet 200.

When the sales registration processing at the electronic cash register 100 ends, the sales registration processing can be performed by operating the touch panel display 231 of the tablet 200. At this time, the sales registration screen 240A (see FIG. 10) is displayed on the touch panel display 231 of the tablet 200 in place of the clerk display unit alternate screen 250. Therefore, the clerk can easily recognize that the displayed commodities are registered by operating the touch panel display 231 of the tablet 200 instead of the electronic cash register 100. During the sales registration processing, information on and the subtotal of selected commodities are displayed on the customer display unit 132, a receipt is printed, and the drawer 135 can be used.

Although the present embodiment describes the connection of the electronic cash register 100 during the sales registration processing, the same applies to other processing (modes) such as inspection, calculation, returning, and setting.

Modification: Connection with Tablet During Sales Registration

In the embodiment described above, an error occurs when the tablet 200 is arranged on the electronic cash register 100 during the sales registration processing (see step S202→Y and step S203 in FIG. 13). The tablet 200 may operate alone until the sales registration processing ends; and then the processing of step S204 and subsequent steps may be started.

Modification: Electronic Cash Register Having Different Shape

Figure 16:
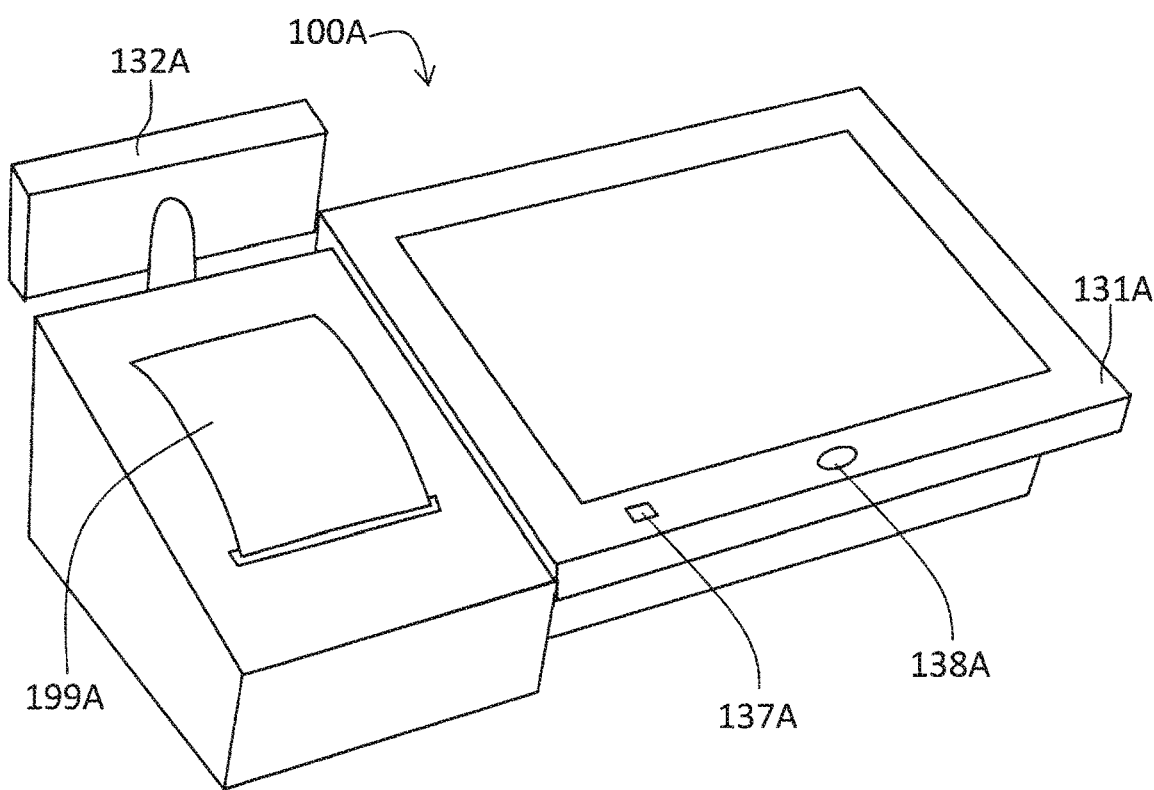
FIG. 16 shows the appearance of an electronic cash register according to a modification of the present embodiment.

The shape of the electronic cash register is not limited to the shape of the electronic cash register 100 shown in FIG. 3, and may be other shapes. FIG. 16 shows the appearance of an electronic cash register 100A according to a modification of the present embodiment. Similarly to the electronic cash register 100, the electronic cash register 100A includes a clerk display unit 131A (touch panel display in the present modification) and the customer display unit 132A. The electronic cash register 100A includes a printer 134A in a housing of the electronic cash register 100A at a position below a receipt 199A. The clerk display unit 131A includes a power transmission module 137A and a sensor 138A.

Figure 17:
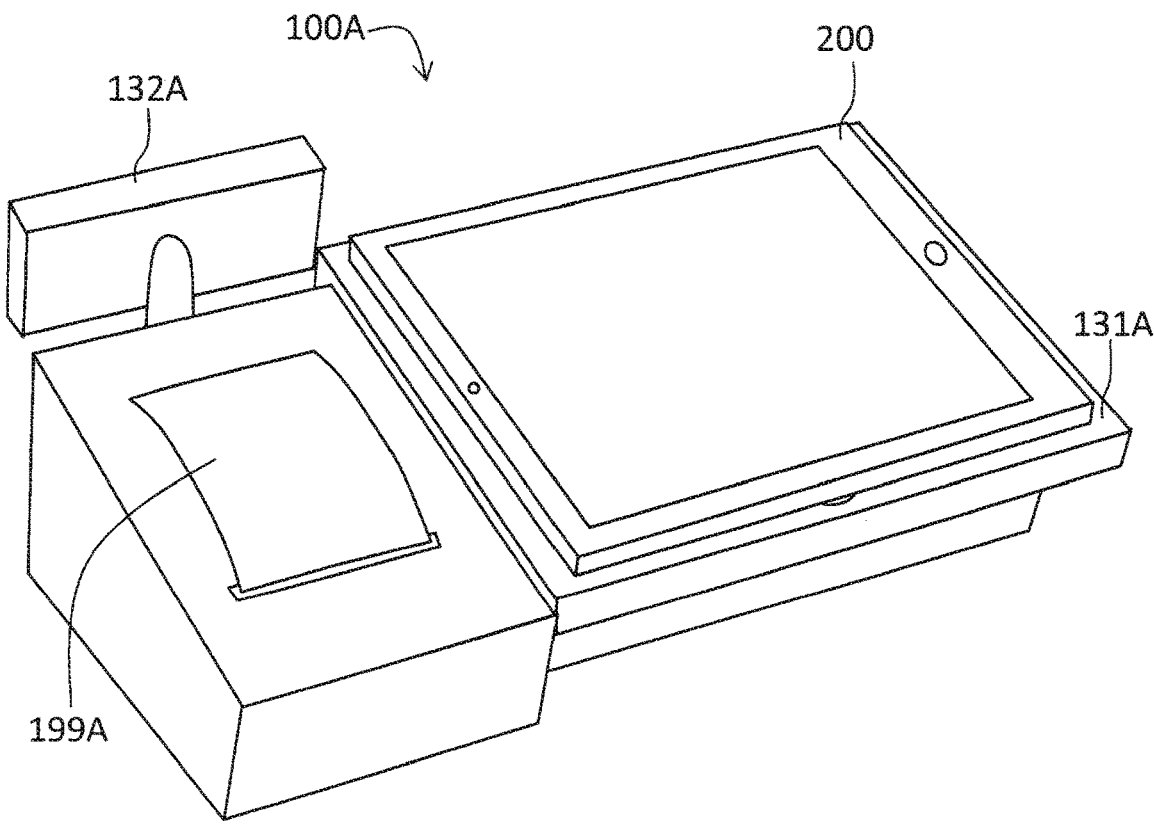
FIG. 17 shows the appearance when a tablet is arranged on the electronic cash register according to the modification of the present embodiment.
Figure 18:
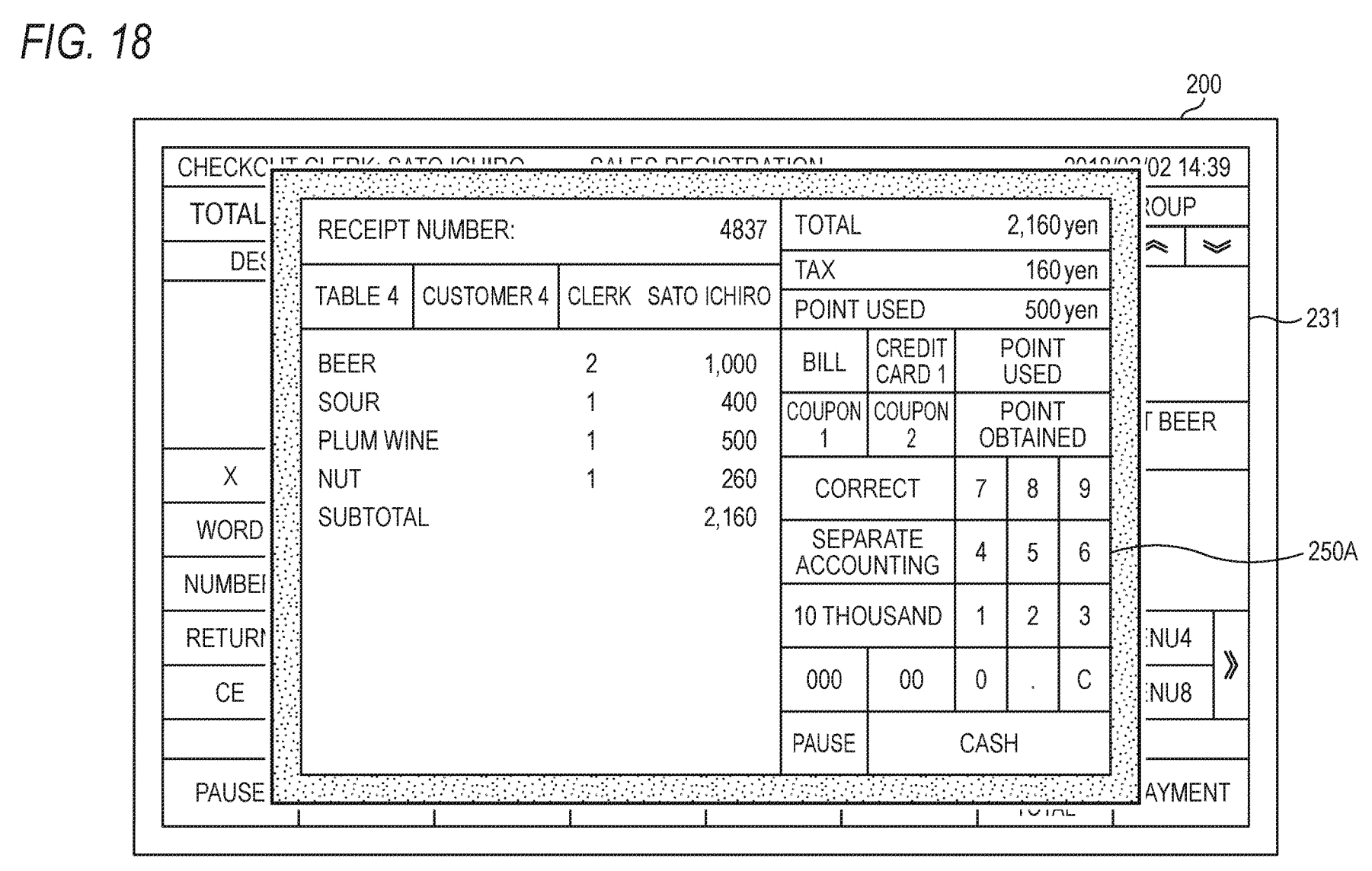

FIG. 17 shows the appearance when the tablet 200 is arranged on the electronic cash register 100A according to the modification of the present embodiment. FIG. 18 shows a display screen of the tablet 200 during the sales registration processing at the electronic cash register 100A after the electronic cash register 100A and the tablet 200 are connected according to the modification of the present embodiment. At the center of the touch panel display 231, the screen of the clerk display unit 131A during the sales registration processing at the electronic cash register 100A is displayed as a clerk display unit alternate screen 250A.

The clerk display unit alternate screen 250A is an alternative to the display screen of the clerk display unit 131A of the electronic cash register 100A. The clerk operates the electronic cash register 100A using the clerk display unit alternate screen 250A. Input operation to the electronic cash register 100 is operation to the input key 133 which is direct input operation to the electronic cash register 100. In the present modification, operation to the clerk display unit alternate screen 250A displayed on the touch panel display 231 of the tablet 200 is operation to the electronic cash register 100A via the tablet 200. The CPU 210 of the tablet 200 relays operation on the clerk display unit alternate screen 250A to the electronic cash register 100A.

Modification: Touch Panel Display During Display of Clerk Display Unit Alternate Screen As shown in FIGS. 9 and 18, the sales registration screen 240 is displayed as the background of the clerk display unit alternative screens 250 and 250A. The CPU 210 of the tablet 200 may display only the clerk display unit alternative screens 250 and 250A without the sales registration screen 240.

What is claimed is:

1. A sales registration system comprising:
an electronic cash register comprising a first display on which a display screen relating to sales registration processing is displayed and a first operation panel for accepting an input operation from a user with respect to the sales registration processing;
a portable terminal configured to be wirelessly connectable to the electronic cash register and comprising a touch panel display capable of displaying a second operation panel; and
a processor provided in the electronic cash register or the portable terminal and configured to execute a process comprising:
determining whether or not the sales registration processing is being executed when the portable terminal is switched from a state in which the portable terminal is not wirelessly connected with the electronic cash register to a state in which the portable terminal is wirelessly connected with the electronic cash register; and
when it is determined in the determining that the sales registration processing is being executed, displaying a display screen that is the same as the display screen displayed on the first display, over the second operation panel displayed on the touch panel display to restrict acceptance of the input operation from the user through the second operation panel, until the sales registration processing that is being executed is completed.

2. The sales registration system according to claim 1, wherein the processor stops restricting the acceptance of the input operation from the user through the second operation panel after the sales registration processing that is being executed is completed.

3. The sales registration system according to claim 1, wherein the portable terminal is a tablet terminal, and wherein the first display is a clerk display.

4. The sales registration system according to claim 1, wherein the electronic cash register comprises a clerk display and a customer display, and wherein the first display is the clerk display.

5. The sales registration system according to claim 1, wherein the displaying comprises displaying the display screen that is the same as the display screen displayed on the first display, over the second operation panel displayed on the touch panel display such that a size of the display screen displayed over the second operation panel is smaller than a size of the second operation panel.

6. A non-transitory computer-readable recording medium that stores a program that is executable by a computer provided in a sales registration system, the sales registration system comprising: (i) an electronic cash register comprising a first display on which a display screen relating to sales registration processing is displayed and a first operation panel for accepting an input operation from a user with respect to the sales registration processing; and (ii) a portable terminal configured to be wirelessly connectable to the electronic cash register and comprising a touch panel display capable of displaying a second operation panel, wherein the input operation from the user with respect to the sales registration processing is capable of being accepted through the second operation panel, while the electronic cash register and the portable terminal are wirelessly connected with each other, wherein the program is executable by the computer to cause the computer to perform functions comprising:

determining whether or not the sales registration processing is being executed when the portable terminal is switched from a state in which the portable terminal is not wirelessly connected with the electronic cash register to a state in which the portable terminal is wirelessly connected with the electronic cash register; and when it is determined in the determining that the sales registration processing is being executed, displaying a display screen that is the same as the display screen displayed on the first display, over the second operation panel displayed on the touch panel display to restrict acceptance of the input operation from the user through the second operation panel, until the sales registration processing that is being executed is completed.

7. The non-transitory computer-readable recording medium according to claim 6,
wherein the program further causes the computer to perform a function comprising stopping restricting the acceptance of the input operation from the user through the second operation panel after the sales registration processing that is being executed is completed.

8. The non-transitory computer-readable recording medium according to claim 6,
wherein the electronic cash register comprises a clerk display and a customer display, and
wherein the first display is the clerk display.

9. The non-transitory computer-readable recording medium according to claim 6, wherein the displaying comprises displaying the display screen that is the same as the display screen displayed on the first display, over the second operation panel displayed on the touch panel display such that a size of the display screen displayed over the second operation panel is smaller than a size of the second operation panel.

* * * * *